(12) United States Patent
Fei et al.

(10) Patent No.: US 11,354,506 B2
(45) Date of Patent: Jun. 7, 2022

(54) COREFERENCE-AWARE REPRESENTATION LEARNING FOR NEURAL NAMED ENTITY RECOGNITION

(71) Applicant: Baidu USA, LLC, Sunnyvale, CA (US)

(72) Inventors: Hongliang Fei, Sunnyvale, CA (US);
Zeyu Dai, College Station, TX (US);
Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 405 days.

(21) Appl. No.: 16/526,614

(22) Filed: Jul. 30, 2019

(65) Prior Publication Data
US 2021/0034701 A1    Feb. 4, 2021

(51) Int. Cl.
| | |
|---|---|
| *G06F 40/295* | (2020.01) |
| *G06N 3/08* | (2006.01) |
| *G06N 3/02* | (2006.01) |
| *G06N 20/00* | (2019.01) |
| *G06N 5/04* | (2006.01) |
| *G06F 17/18* | (2006.01) |

(52) U.S. Cl.
CPC ............ *G06F 40/295* (2020.01); *G06F 17/18* (2013.01); *G06N 3/02* (2013.01); *G06N 3/08* (2013.01); *G06N 5/046* (2013.01); *G06N 20/00* (2019.01)

(58) Field of Classification Search
CPC ........ G06N 3/08; G06N 3/0454; G06N 20/00; G06N 3/02; G06N 3/088; G06F 40/295; G06F 40/35; G06F 16/3329; G06F 16/35; G06F 16/75; G06F 30/27; G06F 40/20; G06F 16/355; G06F 16/90332; G10L 15/16; G10L 25/30; G10L 17/18; G06K 9/6267; G06K 2209/01; G06K 9/344
See application file for complete search history.

(56) References Cited

U.S. PATENT DOCUMENTS 10,049,103 B2 * 8/2018 Perez ...................... G10L 25/30
11,055,557 B2 * 7/2021 Chatterjee .......... G06Q 30/0623
(Continued)

OTHER PUBLICATIONS

Chiu et al, Named Entity Recognition with Bidirectional LSTM-CNNs, Transactions of the Association for Computational Linguistics, vol. 4, pp. 357-370, 2016 (Year: 2016).*
(Continued)

*Primary Examiner* — Linda Wong
(74) *Attorney, Agent, or Firm* — North Weber & Baugh LLP

(57) ABSTRACT

Previous neural network models that perform named entity recognition (NER) typically treat the input sentences as a linear sequence of words but ignore rich structural information, such as the coreference relations among non-adjacent words, phrases, or entities. Presented herein are novel approaches to learn coreference-aware word representations for the NER task. In one or more embodiments, a "CNN-BiLSTM-CRF" neural architecture is modified to include a coreference layer component on top of the BiLSTM layer to incorporate coreferential relations. Also, in one or more embodiments, a coreference regularization is added during training to ensure that the coreferential entities share similar representations and consistent predictions within the same coreference cluster. A model embodiment achieved new state-of-the-art performance when tested.

20 Claims, 11 Drawing Sheets

(56) References Cited

U.S. PATENT DOCUMENTS

| | | | |
|---|---|---|---|
| 11,120,334 B1* | 9/2021 | Carvalho | G06N 3/08 |
| 2019/0188295 A1* | 6/2019 | Sirotkovic | G06N 3/0445 |
| 2019/0311210 A1* | 10/2019 | Chatterjee | G06N 5/046 |
| 2020/0073933 A1* | 3/2020 | Zhao | G06F 40/295 |
| 2021/0034856 A1* | 2/2021 | Torres | G06N 3/08 |
| 2021/0240931 A1* | 8/2021 | Farri | G16H 30/40 |

OTHER PUBLICATIONS

Durret et al, A Joint Model for Entity Analysis: Coreference, Typing, and Linking, Transactions of the Association for Computation Linguistics, vol. 2, pp. 477-490, 2014 (Year: 2014).*

Ling Jin, Deep into End to End Neural Coreference Model, https://towardsdatascience.com/deep-into-end-to-end-neural-coreference-model-58c317cfdb83, pp. 1-15, Feb. 27, 2019 (Year: 2019).*

Li et al, Causality extraction based on self-attentive BiLSTM-CRF with transferred embeddings, Neurocomputing 423, pp. 207-219, 2021 (Year: 2021).*

Long et al, A method of Chinese Named Entity Recognition Based on CNN-BiLSTM-CRF Model, International Conference of Pioneering Computer Scientists, Engineers and Educators ICPCSEE 2018: Data Science pp. 161-175 (Year: 2018).*

Luo et al., "Joint entity recognition and disambiguation," In EMNLP, pp. 879-888, 2015. (10pgs).

Ma et al., "End-to-end sequence labeling via bi-directional LSTM-CNNs-CRF," arXiv preprint arXiv:1603.01354, 2016. (12 pgs).

Manning et al., "The Stanford corenlp natural language processing toolkit," In ACL: system demonstrations, pp. 55-60, 2014. (6 pgs).

Peng et al., "Cross-sentence n-ary relation extraction with graph LSTMs," arXiv preprint arXiv:1708.03743, 2017. (15pgs).

Peters et al., "Semi-supervised sequence tagging with bidirectional language models," arXiv preprint arXiv:1705.00108, 2017. (10pgs).

Peters et al., "Deep contextualized word representations," arXiv preprint arXiv: 1802.05365, 2018. (15 pgs).

Pradhan et al., "CoNLL-2011 Shared Task: Modeling Unrestricted Coreference in OntoNotes," In CoNLL: Shared Task, pp. 1-27, 2011. (27pgs).

Ratinov et al., "Design challenges and misconceptions in named entity recognition," In Proc. of the13th conf. on computational natural language learning, 2009.( 9pgs).

Sang et al., "Introduction to the CoNLL-2003 shared task: Language-independent named entity recognition," arXiv preprint arXiv:cs/0306050, 2003. (6 pgs).

Shen et al., "Deep active learning for named entity recognition," arXiv preprint arXiv:1707.05928, 2018. (15 pgs).

Fei et al., "End-to-End deep reinforcement learning based coreference resolution," In ACL, 2019. (6pgs).

Ghaddar et al., "Robust lexical features for improved neural network named-entity recognition," arXiv preprint arXiv:1806.03489, 2018. (12pgs).

Huang et al., "Bidirectional LSTM-CRF models for sequence tagging," arXiv preprint arXiv:1508.01991, 2015. (10 pgs).

Jie et al., "Efficient dependency-guided named entity recognition," arXiv preprint arXiv:1810.08436, 2018. (18pgs).

Lample et al.,"Neural architectures for named entity recognition," arXiv preprint arXiv:1603.01360, 2016. (11pgs).

Lee et al.,"Higher-order coreference resolution with coarse-to-fine inference," arXiv preprint arXiv:1804.05392, 2018. (6pgs).

Li et al.,"Incremental joint extraction of entity mentions and relations," In ACL, pp. 402-412, 2014. (11pgs).

Li et al.,"Leveraging linguistic structures for named entity recognition with bidirectional recursive neural networks," In EMNLP, pp. 2664-2669, 2017. (6 pgs).

Liu et al.,"Empower sequence labeling with task-aware neural language model," arXiv preprint arXiv:1709.04109, 2017. (8 pgs).

Luan et al.,"Multi-task identification of entities, relations, and coreference for scientific knowledge graph construction," arXiv preprint arXiv:1808.09602, 2018. (14pgs).

Singh et al.,"Joint inference of entities,relations, and coreference," In AKBC@CIKM 2013, 2013. (6pgs).

Socher et al.,"Reasoning with neural tensor networks for knowledge base completion," In NIPS, 2013. (10 pgs).

Strubell et al.,"Fast and accurate entity recognition with iterated dilated convolutions," arXiv preprint arXiv:1702.02098, 2017. (13 pgs).

Swayamdipta et al.,"Multi-mention learning for reading comprehension with neural cascades," arXiv preprint arXiv:1711.00894, 2018. (12 pgs).

Tran et al.,"Named entity recognition with stack residual LSTM and trainable bias decoding," In IJCNLP, pp. 566-575, 2017. (10 pgs).

Yang et al.,"Leveraging knowledge bases in LSTMs for improving machine reading," In ACL, pp. 1436-1446, 2017. (11pgs).

Yang et al.,"Ncrf++: An open-source neural sequence labeling toolkit," arXiv preprint arXiv:1806.05626, 2018. (6pgs).

Yang et al.,"Transfer learning for sequence tagging with hierarchical recurrent networks," arXiv preprint arXiv:1703.06345, 2017. (10 pgs).

Yang et al.,"Design challenges and misconceptions in neural sequence labeling," arXiv preprint arXiv:1806.04470, 2018. (11 pgs).

Ye et al.,"Hybrid semimarkov CRF for neural sequence labeling," In ACL, pp. 235-240, 2018. (6pgs).

Bahdanau et al.,"Neural machine translation by jointly learning to align and translate," arXiv preprint arXiv:1409.0473, 2016. (15pgs).

Chiu et al.,"Named entity recognition with bidirectional LSTM-CNNs," TACL, 4:357-370, 2016. (14pgs).

Clark et al., "Semi-Supervised Sequence Modeling with Cross-View Training," arXiv preprint arXiv:1809.08370, 2018. (17pgs).

Collobert et al.,"Natural language processing (almost) from scratch," Journal of Machine Learning Research, 12:2493-2537, 2011. (45pgs).

Devlin et al.,"BERT: Pre-training of Deep Bidirectional Transformers for Language Understanding," arXiv preprint arXiv:1810.04805, 2019. (16pgs).

Dhingra et al.,"Linguistic knowledge as memory for recurrent neural networks," arXiv preprint arXiv:1703.02620, 2017. (10 pgs).

Dhingra et al.,"Neural models for reasoning over multiple mentions using coreference," arXiv preprint arXiv:1804.05922, 2018. (7pgs).

Dong et al.,"Knowledge vault: a web-scale approach to probabilistic knowledge fusion," In ACM SIGKDD, pp. 601-610, 2014. (10pgs).

Santos et al.,"Learning character-level representations for part-of-speech tagging," In ICML, 2014. (9pgs).

Durrett et al.,"A joint model for entity analysis: Coreference, typing, and linking," TACL, 2:477-490, 2014. (14pgs).

* cited by examiner

400

```
┌─────────────────────────────────────────────────────┐
│ Input a document (or set of documents) into a       │
│ coreference-aware named entity recognition (NER)    │──── 405
│ network                                             │
└─────────────────────────────────────────────────────┘
                          │
                          ▼
┌─────────────────────────────────────────────────────┐
│ For each word, combine outputs of the word embedding│
│ layer, the extra feature(s) embedding layer, and the│──── 410
│ character-level CNN into a combined representation  │
└─────────────────────────────────────────────────────┘
                          │
                          ▼
┌─────────────────────────────────────────────────────┐
│ Obtain the hidden representations of the words in   │
│ the document using the combined representations and │──── 415
│ the word-level BLSTM                                │
└─────────────────────────────────────────────────────┘
                          │
                          ▼
┌─────────────────────────────────────────────────────┐
│ Use the hidden representations for the words in the │
│ document and a set of coreference clusters          │
│ associated with the document in which each          │
│ coreference cluster in the set of coreference       │
│ clusters comprises one or more words, phrases, or   │──── 420
│ both that represent a same entity as an input to the│
│ coreference layer to obtain a coreference           │
│ representation for each word in the document, in    │
│ which words that are members of the same coreference│
│ cluster are assigned a same or similar coreference  │
│ representation                                      │
└─────────────────────────────────────────────────────┘
                          │
                          ▼
┌─────────────────────────────────────────────────────┐
│ Determine a label sequence for the document using   │
│ the coreference representations as inputs into the  │──── 425
│ CRF layer that jointly determines the label sequence│
└─────────────────────────────────────────────────────┘
                          │
                          ▼
┌─────────────────────────────────────────────────────┐
│ Minimize an objective function to update parameters │
│ of the coreference-aware NER network                │──── 430
└─────────────────────────────────────────────────────┘
```

FIG. 4

TABLE 2

| Parameter | Value | Parameter | Value | Parameter | Value |
|---|---|---|---|---|---|
| char emb size | 30 | word emb size | 100 | POS emb | 15 |
| char CNN units | 50 | word LSTM units | 300 | Cap emb | 5 |
| char CNN window | 3 | word LSTM layer | 1 | dropout | 0.5 |
| char CNN layer | 1 | ELMo emb size | 1024 | lr decay | 5% |
| | | | | optimizer | SGD with momentum 0.9 |
| | | | | initial lr | 0.015 |
| | | | | batch size | 1 (Dataset 1) / 5 (Dataset 2) |
| | | | | coref $\lambda$ | 0.01, 0.1, 0.5, 1.0, 1.5, 2.0, 5.0 |

FIG. 7

Table 3

| Model | F1 Score (± std) | |
|---|---|---|
| | Train | Train + Dev |
| Previous work w/o using external data | | |
| [Huang et al., 2015] | 90.10 | - |
| [Strubell et al., 2017] | 90.65 (± 0.15) | - |
| [Shen et al., 2018] | 90.89 (± 0.19) | - |
| [Lample et al., 2016] | 90.94 | - |
| [Ma and Hovy, 2016] | 91.21 | - |
| [Liu et al., 2018]* | 91.24 (± 0.12) | - |
| [Ye and Ling, 2018]* | 91.38 (± 0.10) | - |
| Previous work w/ using external data | | |
| [Chiu and Nichols, 2016] | 91.23 (± 0.16) | 91.62 (± 0.33) |
| [Yang et al., 2017] | 91.26 | - |
| [Tran et al., 2017]* | 91.69 | - |
| [Peters et al., 2017]* | - | 91.93 (± 0.19) |
| ELMo [2018]* | - | 92.22 (± 0.10) |
| BERT Base [2019]* | 92.40 | - |
| CVT + MultiTask [2018]* | 92.61 (± 0.09) | - |
| Document-level NER in this work | | |
| CNN-BiLSTM-CRF | 90.88 (± 0.13) | 91.31 (± 0.13) |
| + coreference layer | 91.53 (± 0.14) | 91.86 (± 0.11) |
| + coref regularization | 91.65 (± 0.15) | 92.03 (± 0.14) |
| + ELMo embedding* | 93.19 (± 0.13) | 93.37 (± 0.14) |

FIG. 8

Table 4

| Model | F1 Score (± std) |
|---|---|
| Previous work | |
| [Chiu and Nichols, 2016] | 86.41 (± 0.22) |
| [Shen et al., 2018] | 86.63 (± 0.49) |
| [Strubell et al., 2017] | 86.99 (± 0.22) |
| [Li et al., 2017] | 87.21 (± 0.14) |
| [Ghaddar and Langlais, 2018] | 87.95 (± 0.13) |
| CVT + MultiTask [2018] | 88.81 (± 0.09) |
| JointNERCoref [Luan et al., 2018][4] | 84.09 (± 0.16) |
| Document-level NER in this work | |
| CNN-BiLSTM-CRF | 88.06 (± 0.13) |
| Use CoreNLP-generated coreference knowledge | |
| + coreference layer | 88.67 (± 0.15) |
| + coref regularization | 88.95 (± 0.13) |
| + ELMo embedding | 89.83 (± 0.11) |
| Use gold coreference knowledge | |
| + coreference layer | 88.85 (± 0.13) |
| + coref regularization | 89.08 (± 0.12) |
| + ELMo embedding | 89.96 (± 0.10) |

FIG. 9

COREFERENCE-AWARE REPRESENTATION LEARNING FOR NEURAL NAMED ENTITY RECOGNITION

BACKGROUND

A. Technical Field

The present disclosure relates generally to systems and methods for computer learning that can provide improved computer performance, features, and uses. More particularly, the present disclosure relates to embodiments for learning coreference-aware word representations.

B. Background

Named entity recognition (NER) is one of the fundamental tasks in natural language processing (NLP), which has a huge impact on many downstream applications including relation extraction, knowledge base completion, and entity linking. Given an input text, NER aims to locate and classify named entities from raw text into pre-defined semantic types, such as persons (PER), organizations (ORG), locations (LOC), etc.

The traditional approach for the NER is to regard it as a sequence labeling task, in which each word is assigned with a tag (e.g., "B-PER" (beginning word of a PERSON semantic type), "I-PER" (intermediate word of a PERSON semantic type), "O" ("other" word, which is a word with no semantic type or a semantic type that is not of interested for a current analysis) in BIO tagging schema) indicating whether the word belongs to part of any named entity or not. To improve the performance of NER, recent NLP researchers usually applied the latest and sophisticated neural sequence labeling models, such as the BiLSTM-CRF architecture, which first uses the bidirectional long short-term memories (LSTMs) to process input sentences and then employs a Conditional Random Field (CRF) to label each word jointly.

Although recent neural network models have advanced the state-of-the-art performance of NER, they simply treat the input text as a linear sequence of words but disregard non-sequential structural information such as coreferential relations (i.e., two or more mentions refer to the same person or thing) between entities whose position can be far away in the raw context. Such a limitation may cause these models to produce globally inconsistent semantic type predictions.

FIG. 1 shows a typical failure case when applying the well-known model of Ma and Hovy (2016) (Xuezhe Ma and Eduard Hovy, "End-To-End Sequence Labeling via Bi-Directional LSTM-CNNs-CRF," in ACL, pages 1064-1074, 2016) to two sentences. As illustrated in FIG. 1, the entities "Otelul Galati" and "National Bucharest" are both ORGANIZATION names, but the model of Ma and Hovy (2016) wrongly predicted them as LOCATION entities in the first sentence. Based on error analysis, 20%-25% errors made by Ma and Hovy (2016) belong to this category.

Accordingly, what is needed are improved systems and methods for learning and obtaining coreference-aware word representations for name entity recognition (NER).

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts a method for training a coreference-aware NER model, according to embodiments of the present disclosure.

FIG. 7 contains TABLE 2, which summarizes the hyper-parameters used in experiments, according to embodiments of the present disclosure.

FIG. 8 contains TABLE 3, which shows NER performance on a test set, according to embodiments of the present disclosure.

FIG. 9 contains TABLE 4, which shows NER performance on another test set, according to embodiments of the present disclosure.

DETAILED DESCRIPTION OF EMBODIMENTS

Figure 1:
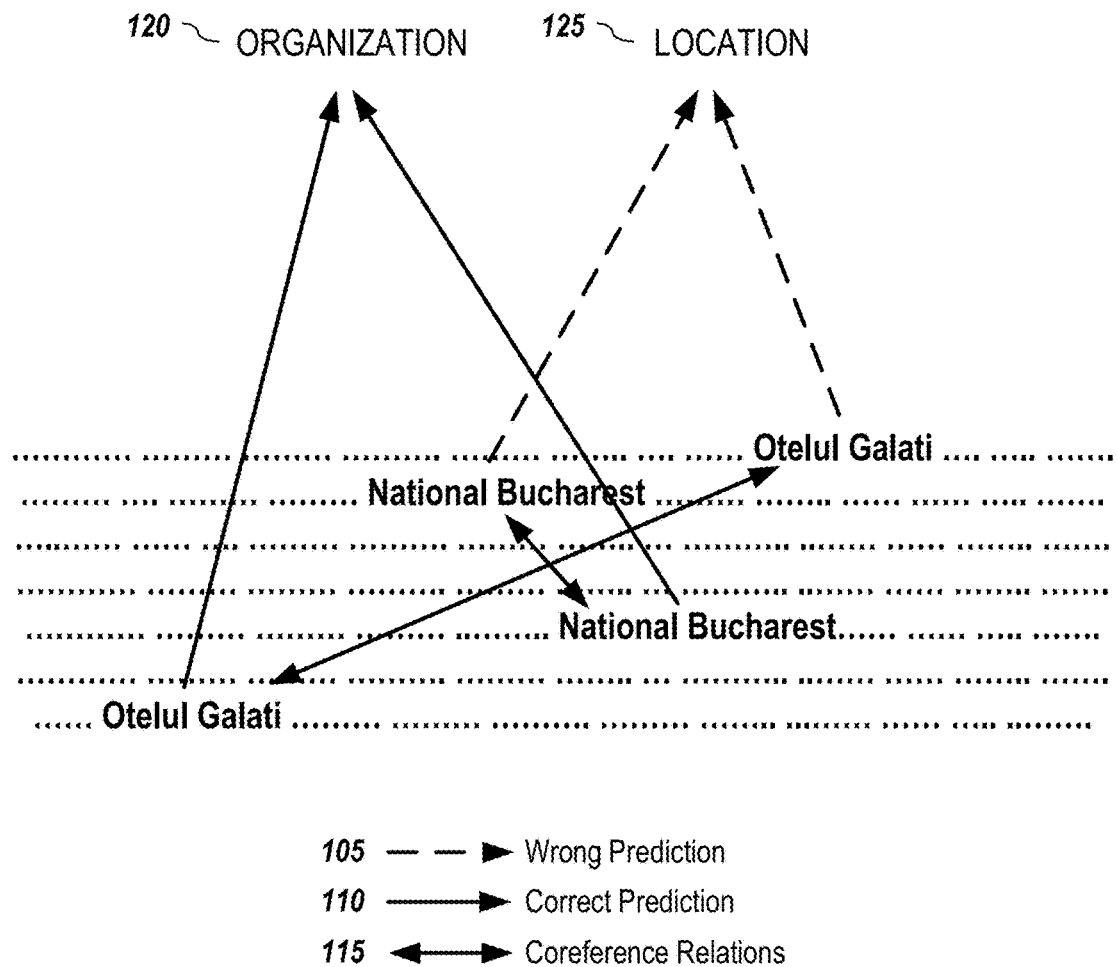
FIG. 1 depicts an example of inconsistency errors made by a third-party model.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "document" as used herein shall be understood to mean a set of sentences, phrases, or both. An "entity" shall be understood to mean persons, locations, organizations, products, thing, etc., but may also mean, in embodiments, words that refer to a distinct concept, whether tangible or intangible. A "layer" may comprise one or more operations.

Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

As noted above, traditional approaches for named entity recognition (NER) regard it as a sequence labeling task. However, simply treating the input text as a linear sequence of words and disregarding non-sequential structural information, such as coreferential relations (i.e., two or more mentions refer to the same person or thing) between entities whose position can be far away in the raw context, tends to cause these models to produce globally inconsistent semantic type predictions. Conceptually, if two entities belong to the same coreference cluster, they should have the same semantic type. Note that, as illustrated in FIG. 1, that even that relatively short passage included multiple references to the same entity, but they were assigned different entity types. However, as shown in FIG. 1, a NER model that incorporates coreference relations would help fix the mislabeling errors.

Recent end-to-end neural network models for coreference resolution have achieved increasing accuracy over the years, which make it possible and practical to automatically extract coreferential relations from the raw text without relying on human-annotated coreference knowledge. Therefore, a key research question is how to incorporate extracted coreference relations into the NER models for predicting consistent semantic type across coreferential entity mentions.

To address the above question, presented herein are embodiments of coreference-aware representation learning framework based on the "CNNBiLSTM-CRF" NER model of Ma and Hovy (2016). Specifically, in one or more embodiments, a coreference component is added on top of the BiLSTM layer to incorporate prior knowledge about coreferential relations among entity mentions, either from the ground truth or external coreference resolvers. Furthermore, in one or more embodiments, a coreference regularization term is included to enforce the coreferential words/entities to have similar representations for the NER tag labeling. In one or more embodiments, the combined objective function maximizes both the probability of decoded tag sequence given the input text and the consensus among the coreferential entities' hidden representations.

Some of the major contributions presented in this patent document include the following:

Presented herein are embodiments of coreference-aware NER models, which operate at the document-level and can explicitly leverage the global structural information of coreferential relations. By introducing a coreference layer component and coreference regularization into a base model, full model embodiments enjoy both the strong generalization performance of deep neural network models and the enhancement from coreference guidance. To knowledge of the inventors, these embodiments are the first neural NER models that effectively exploit coreference relations.

Embodiments of the model were tested on two datasets for benchmarking. On both benchmarks, the full model embodiments outperformed all previous approaches with 0.4-1.0% absolute improvement, even when a third-party CoreNLP toolkit generates the coreferential relations.

While a focus was on improving the NER by using the coreference knowledge, model embodiments sheds light on other NLP tasks in which there is external knowledge base of structural information available. For example, the entity/event relations may also be incorporated into neural networks for boosting the performance of challenging NLP tasks, including discourse parsing, question answering, and natural language understanding.

B. Some Related Work

1. Neural Named Entity Recognition (NER)

Recently, neural network-based NER models have achieved great improvement over the earlier features-based models. Those neural networks use different strategies (e.g., convolutional neural networks (CNNs) or recurrent neural networks (RNNs)) to encode characters and words into hidden representations and decode them to named entity tags with a CRF (or LSTM) layer. Another trend for better NER performance is to improve the word embedding with hidden representation depending on word's context by pretraining deep language model on characters or external unlabeled sentences. However, most previous works mainly consider NER as a traditional sequence labeling problem but ignore the rich structural information within contexts, such as the coreferential relations used in this patent document.

Utilizing external knowledge to improve the NER has also received attention from NLP researchers. Some used the dependency or constituency parse trees to guide NER, while others leveraged an external knowledge base to facilitate entity extraction. Still others proposed features-based joint models to conduct the NER and coreference inference simultaneously. In contrast, model embodiments are end-to-end deep neural network models, and a focus is on using the coreferential relations as prior knowledge to learn coreference-aware representations for the NER, instead of jointly modeling NER and coreference resolution.

Some researchers have proposed a deep multitask framework to jointly perform the NER, relation extraction, and coreference resolution, wherein the three tasks shared common hidden layers. However, such an approach suffers from high computational complexity $O(L^4)$, where L is the input sequence length. In addition, the implicit knowledge sharing at the hidden layers cannot explicitly transfer coreference information into the NER task, so it is not as effective as the embodiments herein, which can explicitly utilize the coreference relations.

2. Incorporating Coreference Knowledge into the Neural Network Models

As one important type of linguistic structural information, the coreference knowledge has been explored to improve the performance of neural network models for many NLP applications, such as reading comprehension and relation extraction. Since the embodiments herein are the first to exploit coreference knowledge in neural NER models, an aim is also to study a task-specific approach for encoding the coreferential relations.

One way to encode the coreferential relations within neural networks is to use external gate (or memory) in RNNs (or memory networks) as the bottom-level component. However, this method can only at best implicitly utilize the coreference knowledge since the coreference information can be easily lost during the bottom-level forward propagation when processing a long sequence of inputs with increased size of the hidden units (e.g., the model used more hidden units to keep track of each coreference cluster). Another way to explicitly introduce the coreference knowledge would be to build the coreference-aware word representations at the top-level of neural network models, which usually uses vector transformation functions, including a feedforward neural network, neural tensor network, soft-attention mechanism, and/or others, on top of the word-level RNNs (or CNNs) to refine entity mention representations. In one or more embodiments herein, a top-level approach is employed in designing embodiments of the coreference layer component herein, so that the encoded coreference relations can directly and explicitly influence the final word representations.

C. Neural Network Model Embodiments for NER

In this section, a base model for neural named entity recognition is first introduced; then, embodiments of a coreference layer component are presented, in which the a coreference layer component extends the base model by incorporating coreference knowledge. Finally, embodiments are presented that incorporate coreference regularization, which can be used to guide the coreference-aware word representation learning for consistent label prediction of NER.

1. Base Model (CNN-BiLSTM-CRF) Embodiments

In one or more embodiments, the CNN-BiLSTM-CRF model of Ma and Hovy (2016) was selected as a starting point for base model embodiments since it is the most successful NER model as extensively studied by others by comparing different variants of recent neural NER model architectures. It is noted that one skilled in the art shall recognize that different base models may be employed and adapted according to the embodiments illustrated herein.

Figure 2:
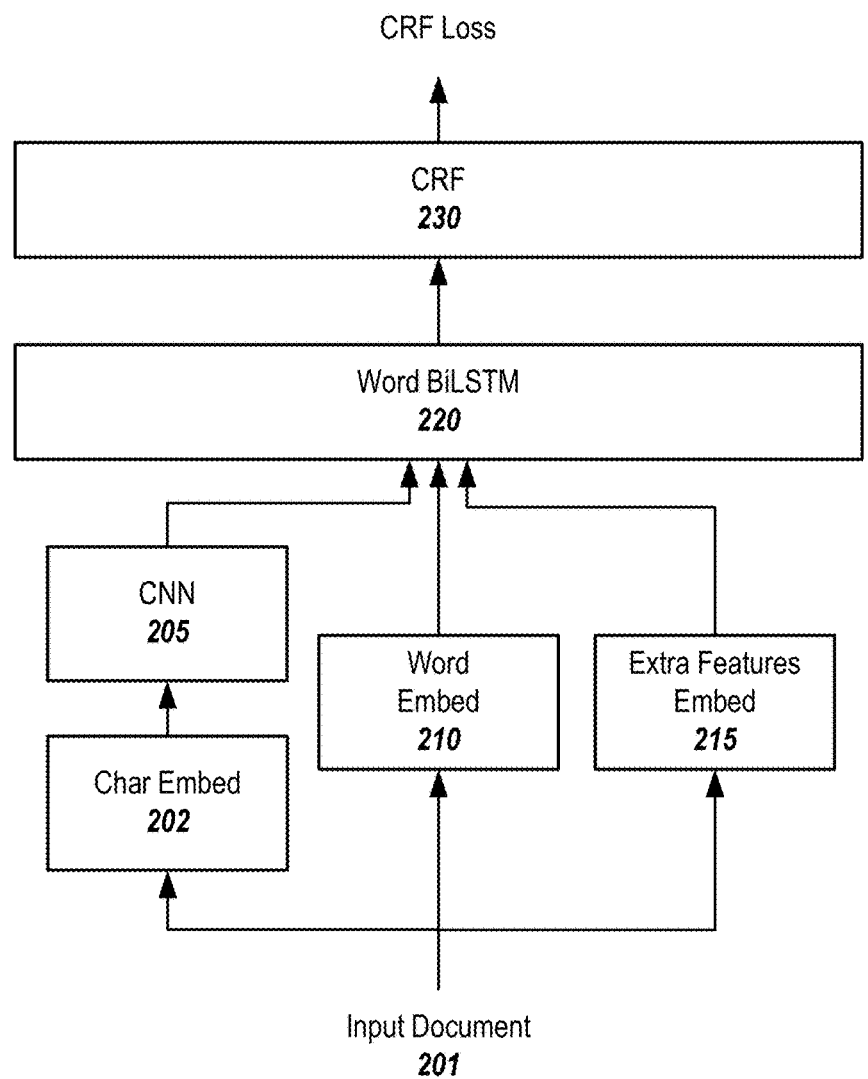
FIG. 2 depicts a base model architecture, according to embodiments of the present disclosure.

FIG. 2 shows a base model, which comprises a character-level CNN component 205, a word-level bidirectional LSTMs component 220, and a CRF layer component 230, which jointly decodes semantic named entity tags, according to embodiments of the present disclosure.

Character-level CNN 205. The character-level features, such as the prefix or suffix of a word, are helpful for alleviating the out-of-vocabulary problem and improving the word representation in neural network models. In one or more base model embodiments, one CNN layer with a max-pooling operation is used to extract character-level features $w_i^{char}$ for the i-th word of the input word sequence. Also note that, in embodiments, the character-level CNN may include a character embedding layer component 202 as an input to the CNN. In one or more embodiments, a character embedding layer is initialized with random vectors for each unique character in the character vocabulary. Given a word, the character embedding layer fetches corresponding vector for each character in the word. In one or more embodiments, the character embedding is updated during model training.

Word-level BiLSTM 220. Given a word sequence $X=(x_1, x_2, \ldots, x_L)$ as the input, for each word $x_i$, in one or more embodiments, an expanded word vector is constructed by combining its word embedding $w_i^{word}$ from a word embedding component 210 with its character-level features from the character-level CNN 205 and with one or more extra word-level features (e.g., part-of-speech (POS) tag). In one or more embodiments, the various embeddings and features may be combined by concatenating them as $w_i=[w_i^{word}, w_i^{char}, w_i^{featues}]$; alternatively, the embedding and features may be combined in a weighted combination, which may be learned. The word-level BiLSTM layer component 220 processes the sequence of expanded word vectors $(w_1, w_2, \ldots, w_L)$ by using two separate LSTMs, with one processing the sequence from left to right and the other processing the sequence from right to left. Therefore, at each word index i, two hidden states $\vec{h}_i, \overleftarrow{h}_i$ are computed, which are concatenated to obtain the word $x_i$'s hidden representation $h_i=[\vec{h}_i, \overleftarrow{h}_i]$.

CRF for Sequence Tagging 230. For the NER task, it is important to model the label dependencies (e.g., "I-ORG" must follow "B-ORG" in BIOES (Beginning, Intermediate, Other, End, and Single word) tagging schema), and jointly decode the best label sequence. Therefore, in one or more embodiments, the CRF component 230 is a better choice for the inference layer since it can dynamically decode a chain of labels and capture the interdependency between adjacent labels by maintaining a state-transition matrix as its parameters.

Given the hidden word representations from the BiLSTM component 220, $H^{(j)}=(h_1^{(j)}, h_2^{(j)}, \ldots, h_L^{(j)})$, and the target label sequence $y^{(j)}=(y_1^{(j)}, y_2^{(j)}, \ldots, y_L^{(j)})$ for the j-th training instance, the following CRF loss may be minimized:

$$L_{CRF}=-\Sigma_j \log p(y^{(j)}|H^{(j)})$$

Here, the conditional probability $p(y|H)$ may take the following form:

$$p(y|H) = \frac{\prod_{i=1}^{L} \psi_i(y_{i-1}, y_i, h_i)}{\sum_{y' \in Y} \prod_{i=1}^{L} \psi_i(y'_{i-1}, y'_i, h_i)}$$

where Y denotes the set of all possible label sequences. $\psi_i(y_{i-1}, y_i, h_i)=\exp(W_{y_{i-1},y_i}^T h_i+b_{y_{i-1},y_i})$ is the potential function, in which W and b are trainable parameters. During testing, the Viterbi algorithm was used to search for the optimal label sequence y* that maximizes the conditional probability: $y^* = \mathrm{argmax}_{y \in \mathcal{Y}}\, p(y|H)$.

2. Coreference Component Model Embodiments

As illustrated and discussed in FIG. 1, since the base model embodiments do not account for the coreferential relations, they will likely predict inconsistent named entity tags for coreferential entities.

Figure 3:
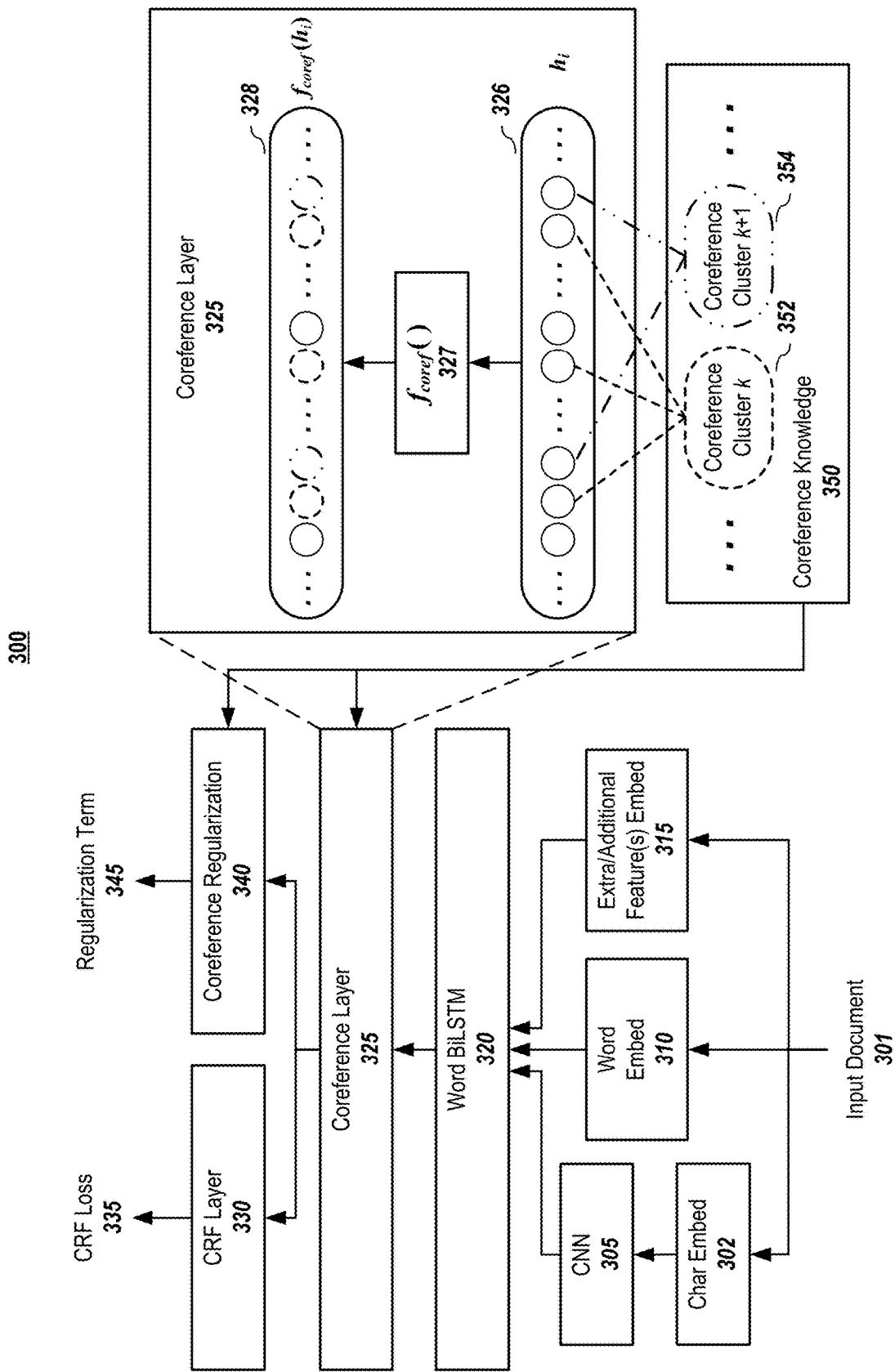
FIG. 3 depicts a document-level model architecture with coreference component and regularization, according to embodiments of the present disclosure.

FIG. 3 depicts a document-level model architecture with coreference component and regularization, according to embodiments of the present disclosure. Similar to the base model embodiment depicted in FIG. 1, the model architecture 300 comprises a word embedding component 310, an additional feature(s) embedding component 315, and a character-level CNN 305 that includes a character embedding component 302 as an input to the CNN. These components 302/305, 310, and 315 receive a document, or a set of documents (if done in batch or done serially), and their outputs are combined as an input to a word-level bi-direction long short-term memory component 320.

To alleviate this problem, in one or more embodiments, a coreference component or network 325 is added between the word-level BiLSTM component 320 and the CRF layer component 330 into a base model embodiment, as shown in FIG. 3. The addition of the coreference component 325 incorporates coreferential relations for learning the coreference-aware word representations in the model architecture 300.

In one or more embodiments, it is assumed that document-level coreference relations are given in the form of coreference clusters 350, which are either ground truth or generated by a third-party coreference resolver. In embodiments, there is no overlap between any two coreference clusters, because they will be merged into one cluster if they share any entity mentions. As the input of the coreference layer 325, let $\mathbb{C} = (\mathbb{C}_1, \mathbb{C}_2, \ldots, \mathbb{C}_K)$ denotes the coreference clusters in a document, where $\mathbb{C}_k$ (e.g., cluster 352, 354, etc.) contains the word indices with the corresponding words in one document referring to the same entity. In one or more embodiments, if one entity mention has multiple words (e.g., Los Angeles), only the first word's index is kept because it is much easier to decode the rest words' tags for the CRF layer 330 if the first tag is correct. For each coreference cluster, a feedforward neural network $f_{coref}(\cdot)$ 327 may be used to refine the hidden word representation $h_i$ 326 of coreferential words.

Specifically, in one or more embodiments, given the coreference clusters from the coreference knowledge 350 and hidden word representations 326 from the BiLSTM layer 320, the output vector 328 of the coreference network 325 has the following form:

$$f_{coref}(h_i) = \begin{cases} \tanh(W_{coref}[h_i, h_{\mathbb{C}_k}] + b_{coref}), & \text{if } i \in \mathbb{C}_k \\ h_i, & \text{otherwise} \end{cases} \quad (1)$$

where $W_{coref}$ and $b_{coref}$ are the weight and bias parameters, $h_{\mathbb{C}_k}$ is the coreference vector calculated by applying max-pooling to all word representations in one cluster:

$$h_{\mathbb{C}_k} = \max_{j \in \mathbb{C}_k} h_j$$

A goal of the coreference vector 328 is similar to a "context vector" utilized in a soft-attention mechanism, but a max-pooling may be used instead of computing weights for different word vectors. Clearly, the output word vector 328 from the coreference component 325 is influenced by other hidden word representations within the same coreference cluster through the coreference vector.

In one or more embodiments, an extreme variant of the coreference component 325 may be used, which is to directly use the coreference vector as the output with the following form:

$$f_{coref}(h_i) = \begin{cases} h_{\mathbb{C}_k}, & \text{if } i \in \mathbb{C}_k \\ h_i, & \text{otherwise} \end{cases} \quad (2)$$

In this alternative embodiment, all the words within one coreference cluster (e.g., cluster 352) share the same representation for label tagging. These alternative embodiments are compared and discussed in Section E.2.

3. Coreference Regularization Embodiments

Conceptually, the hidden word representations within one coreference cluster should be similar, so that the CRF layer 330 can make consistent predictions across different coreferential mentions. In one or more embodiments, to guide the word representation learning of the coreference layer, a regularization may be applied them to the output word vectors of the coreference layer component 325. The resulting regularization term may also be minimized as a part of the final objective function during model training.

In one or more embodiments, the regularization is a "Euclidean Coreference Regularization," which calculates the Euclidean distance to penalize the difference between two coreferential word vectors. The coreference regularization term may take the following form:

$$R_{coref} = \sum_k \sum_{(i,j) \in \mathbb{C}_k} \|f_{coref}(h_i) - f_{coref}(h_j)\|_2$$

In one or more alternative embodiments, the regularization is a "Cosine Coreference Regularization," which uses the cosine similarity to measure two word vectors' similarity. The coreference regularization term is as follows:

$$R_{coref} = \sum_k \sum_{(i,j) \in \mathbb{C}_k} (1 - \cos(f_{coref}(h_i), f_{coref}(h_j)))$$

Hence, an overall objective function for a full model embodiment may be:

$$L = L_{CRF} + \lambda \times R_{coref}$$

In Section E.2, two types of coreference regularization are compared, and a reasonable strategy to set the coreference regularization parameter $\lambda$ is presented.

FIG. 4 depicts a method for training a coreference-aware NER model, according to embodiments of the present disclosure. In one or more embodiments, a document comprising words (or a batch comprising a plurality of documents) is input (405) into a coreference-aware named entity recognition (NER) network, such as the one depicted in FIG. 3. For each word of a document, the outputs of the input layers (i.e., the word embedding layer 310, the additional feature(s) embedding layer 315, and the character-level CNN 305) are combined (410) into a combined representation. The combined representations are used by the word-level BLSTM 320 to obtain (415) a hidden representation for each word in the document. The hidden representations for the words in the document are an input to the coreference layer 325, which outputs (420) a coreference representation for each word in the document, in which words that are members of a same coreference cluster are assigned a same or similar coreference network representation. The CRF layer 330 jointly determines (425) the label sequence for the document using the coreference representations. Finally, an objective function is minimized (430) to update parameters of the coreference-aware NER network 300. In one or more embodiments, the objective function includes a coreference regularization term 345.

Figure 5:
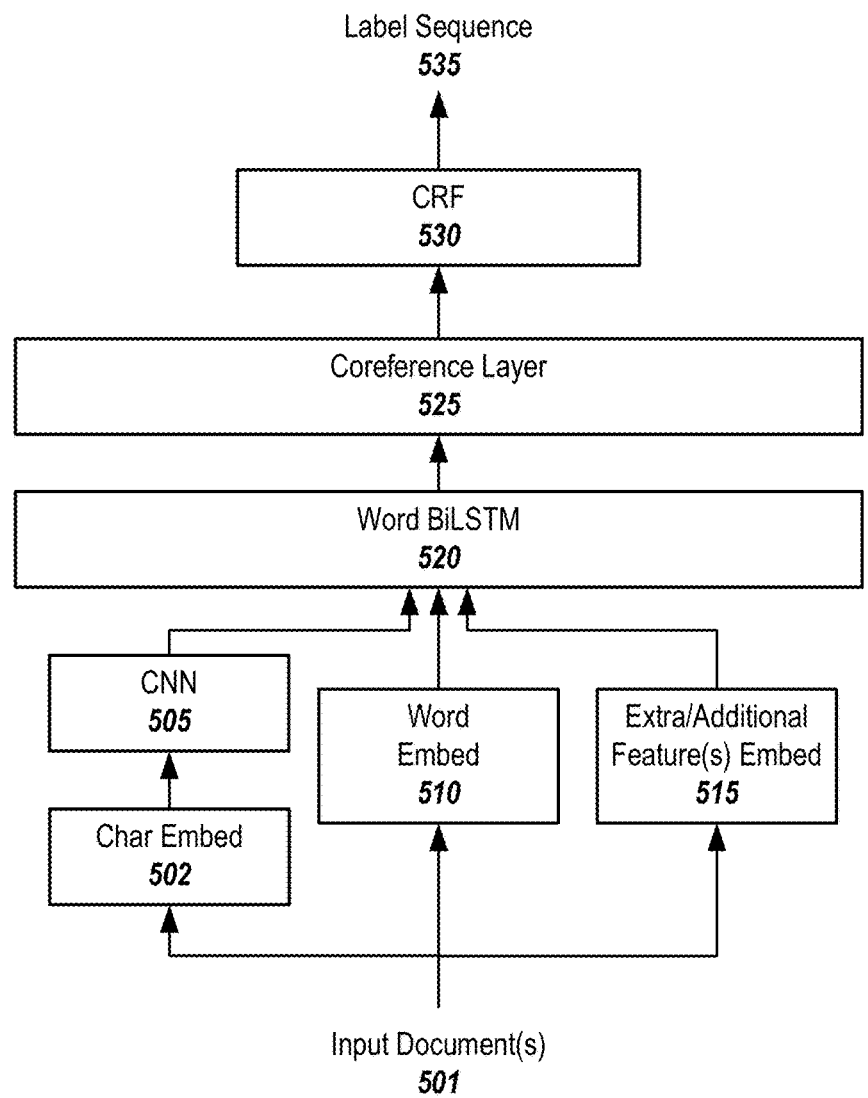
FIG. 5 depicts a trained coreference-aware NER model architecture with coreference component, according to embodiments of the present disclosure, according to embodiments of the present disclosure.
Figure 6:
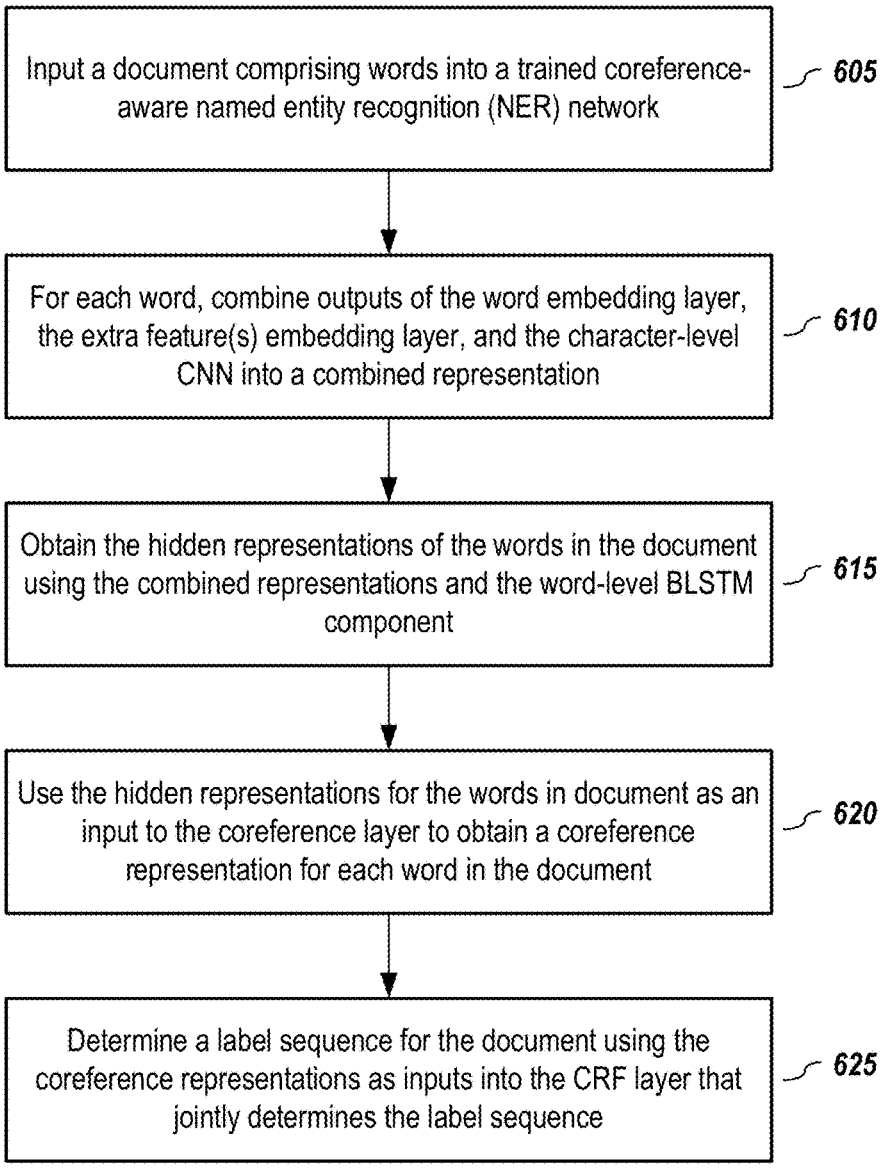
FIG. 6 depicts a method for using a trained coreference-aware NER model, according to embodiments of the present disclosure.

Once a coreference-aware NER model, such as one depicted in FIG. 3, has been trained, a trained model may be formed for use in NER tasks. FIG. 5 depicts a trained coreference-aware NER model architecture with coreference component, according to embodiments of the present disclosure, according to embodiments of the present disclosure, and FIG. 6 depicts a method for using a trained coreference-aware NER model (such as a trained model 500 depicted in FIG. 5), according to embodiments of the present disclosure.

In one or more embodiments, a trained model architecture 500 comprises a set of inputs that receive (605) the document (or documents) input and comprise: a word embedding layer 510; an additional feature(s) embedding layer 515 to allow for input of one or more additional features; a character-level convolution neural network (CNN) 505 with a character embedding layer 502 as an input to the CNN. These components 302/305, 310, and 315 receive a document, or a set of documents (if done in a batch), and their combined outputs (610) is an input to a word-level bi-direction long short-term memory component 520.

The combined representations are used by the word-level BLSTM network 520 to obtain (615) a hidden representation for each word in the document. The hidden representations for the words in the document are an input to the coreference layer 525, which outputs (620) a coreference representation for each word in the document, in which words that are members of a same coreference cluster are assigned a same or similar coreference representation. The CRF network 530 jointly determines (625) the label sequence for the document using the coreference representations, which is the final output for the trained model 500.

D. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Datasets

Model embodiments were tested on two datasets. TABLE 1 gives an overview and statistics of the two datasets.

Dataset 1 was annotated with four coarse-grained entity types, including Person (PER), Location (LOC), Organization (ORG), and Miscellaneous (MISC), while Dataset 2 was annotated with 18 fine-grained named entity types. Compared with Dataset 1, the Dataset 2 corpus was much larger and covered a wider variety of text genres. Since coreference relations were not annotated on the Dataset 1, the latest version of Stanford CoreNLP toolkit (Christopher D. Manning, Mihai Surdeanu, John Bauer, Jenny Finkel, Steven J. Bethard, and David McClosky. 2014. "The Stanford CoreNLP Natural Language Processing Toolkit," In Proceedings of the 52nd Annual Meeting of the Association for Computational Linguistics: System Demonstrations, pp. 55-60) was used to extract coreference clusters in each document, although this toolkit can only achieve around 60% F1-score for coreference resolution. To be directly comparable, the same train/dev/test set splits were used for the datasets.

2. Experimental Settings

Preprocess. All digit characters with "0" were removed and the tagging schema was converted from BIO to BIOES, which additionally used "E-" and "S-" to represent the end of entity and single-word entity, respectively. In the tested embodiments, a part-of-speech (POS) tag and capitalization (Cap) flag of each word was used as extra features, which will be combined (e.g., concatenated) with the word embedding. For all coreference clusters during testing, the word index of personal pronouns (e.g., him, she, it) was masked because these words are not named entities and will not help identify named entities within same coreference cluster, although in embodiments they may be left unmasked.

Fixed vs. Dynamic Word Embedding. Pre-trained word embedding such as GloVe had a limitation that each word's representation is fixed without considering its context, which conflicts with the fact one word can have different meanings in different contexts. Recent work, including AllenAI's ELMo and Google's BERT, showed that context-dependent (dynamic) word representations learned from deep language model can benefit neural networks for challenging NLP tasks, which outperformed the traditional fixed word embedding. In experiments herein, both GloVe word embedding (100D) and dynamic ELMo embedding (1024D) (in which the pre-trained ELMo embedding trained on 5.5B tokens was downloaded from the AllenAI's website (allennlp.org/elmo) and its parameters were frozen during the NER model training) to initialize the word embedding of tested embodiments.

Hyperparameters. FIG. 7 contains TABLE 2, which summarizes the hyperparameters used in experiments, according to embodiments of the present disclosure. Also, a SGD optimizer was used with a decayed learning rate to update parameters. Since the Dataset 2 corpus was much larger than the Dataset 1 corpus, a larger batch size was used to speed up the model training. For the coreference regularization parameter $\lambda$, it is tuned based on the best performance on the dev set. To prevent gradient exploding, the gradient L2-norm

TABLE 1

Dataset statistics counted in the number of named entities.

| Dataset | Train | Dev | Test | Named Entity types | Coreference relation source |
|---|---|---|---|---|---|
| Dataset 1 | 23,499 | 5,942 | 5,648 | 4 | CoreNLP-generated |
| Dataset 2 | 81,828 | 11,066 | 11,257 | 18 | gold or CoreNLP-generated | was clipped with a threshold of 5.0 and the L2 regularization with coefficient $10^{-8}$ was used.

Evaluation. The standard entity-level micro-averaged F1-score was adopted as the main evaluation metrics. To diminish the effects of randomness in training neural network models and report stable experimental results, model embodiments, their variants as well as the base model were run 10 times, and the averaged F1-score and standard deviation over multiple trials is reported. For a fair comparison, all model embodiments were implemented with Pytorch and evaluated on a Nvidia Titan X GPU using the same random seed.

3. Experimental Results

FIG. 8 contains TABLE 3, which shows the performance of model embodiments compared to the recent published models on a test dataset. Note that "Train+Dev" indicates that both the train and dev sets were used for model training after tuning hyperparameters on the dev set, and the models marked with * utilized word embedding from deep language model. The documents cited in TABLE 3 are as follows:

[Huang et al., 2015]. Zhiheng Huang, Wei Xu, and Kai Yu, "Bidirectional LSTM-CRF models for sequence tagging," arXiv preprint arXiv:1508.01991, 2015.

[Strubell et al., 2017]. Emma Strubell, Patrick Verga, David Belanger, and Andrew McCallum, "Fast and accurate entity recognition with iterated dilated convolutions," In EMNLP, 2017.

[Shen et al., 2018]. Yanyao Shen, Hyokun Yun, Zachary Lipton, Yakov Kronrod, and Animashree Anandkumar, "Deep active learning for named entity recognition," In ICLR, 2018.

[Lample et al., 2016]. Guillaume Lample, Miguel Ballesteros, Sandeep Subramanian, Kazuya Kawakami, and Chris Dyer, "Neural architectures for named entity recognition," In NAACLHLT, pages 260-270, 2016.

[Ma and Hovy, 2016]. Xuezhe Ma and Eduard Hovy, "End-to-end sequence labeling via bi-directional LSTM-CNNs-CRF," In ACL, pages 1064-1074, 2016.

[Liu et al., 2018]. Liyuan Liu, Jingbo Shang, Xiang Ren, Frank Fangzheng Xu, Huan Gui, Jian Peng, and Jiawei Han, "Empower sequence labeling with task-aware neural language model," In AAAI, 2018.

[Ye and Ling, 2018]. Zhixiu Ye and Zhen-Hua Ling, "Hybrid semimarkov CRF for neural sequence labeling," In ACL, pages 235-240, 2018.

[Chiu and Nichols, 2016]. Jason Chiu and Eric Nichols, "Named entity recognition with bidirectional LSTM-CNNs," TACL, 4:357-370, 2016.

[Yang et al., 2017]. Zhilin Yang, Ruslan Salakhutdinov, and William Cohen, "Transfer learning for sequence tagging with hierarchical recurrent networks," In ICLR, 2017.

[Tran et al., 2017]. Quan Tran, Andrew MacKinlay, and Antonio Jimeno Yepes, "Named entity recognition with stack residual LSTM and trainable bias decoding," In IJCNLP, pages 566-575, 2017.

[Peters et al., 2017]. Matthew Peters, Waleed Ammar, Chandra Bhagavatula, and Russell Power, "Semi-supervised sequence tagging with bidirectional language models," In ACL, pages 1756-1765, 2017.

ELMo [2018]. Matthew Peters, Mark Neumann, Mohit Iyyer, Matt Gardner, Christopher Clark, Kenton Lee, and Luke Zettlemoyer. Deep contextualized word representations. In NAACLHLT, pages 2227-2237, 2018.

BERT Base [2019]. Jacob Devlin, Ming-Wei Chang, Kenton Lee, and Kristina Toutanova. Bert: Pre-training of deep bidirectional transformers for language understanding. In NAACL-HLT, 2019.

CVT+MultiTask [2018]. Kevin Clark, Minh-Thang Luong, Christopher Manning, and Quoc Le. Semi-supervised sequence modeling with cross-view training. In EMNLP, pages 1914-1925, 2018.

The first section of the table lists the models that did not use any external data other than train set and pre-trained fixed word embedding, while the models in the second section utilized external data for different purposes (e.g., training language model for word embedding [Peters et al., 2018] or doing transfer learning [Yang et al., 2017]). In the third section, the replicated CNN-BiLSTM-CRF model is slightly worse than the one initially reported in Ma and Hovy (2016). One possible reason is that document-level NER tagging is being conducted rather than original sentence-level experiments (the replicated CNN-BiLSTM-CRF model obtain 91.24% F1-score for the sentence-level NER tagging).

The embodiment with a coreference layer component improves the NER performance by 0.65 points on average (statistical significant t-test with $p<0.01$) compared to the base model. Using the coreference regularization to guide the coreference-aware word representation learning improved the result (statistical significant t-test with $p<0.05$ comparing to not using the coreference regularization), but by a small margin. As shown in the last column, introducing the context-dependent ELMo embedding boosts the performance of NER, which further validates the model embodiment's utility when combining with the latest word embedding techniques. Noticing that the full model embodiment significantly outperforms the ELMo baseline (the fifth row in the second section) by ($93.37-92.22=1.15$) points, it may be concluded that the embodiments with coreference layer and coreference regularization can effectively improve the NER performance and play an important role in achieving the best performance.

Overall, the full model embodiment achieved the state-of-the-art performance of 93.19% F1-score when using the dynamic word embedding from language model (comparing to models marked with * in TABLE 3), and an embodiment according to the present disclosure simultaneously obtain the best F1-score of 91.65% when using the fixed word embedding only. This result proves model embodiments can effectively work without relying on the gold coreferential relations.

FIG. 9 contains TABLE 4, which reports experimental results as well as previous approaches that were evaluated on Dataset 2. The documents cited in TABLE 4 are as follows:

[Chiu and Nichols, 2016]. Jason Chiu and Eric Nichols, "Named entity recognition with bidirectional LSTM-CNNs," TACL, 4:357-370, 2016.

[Shen et al., 2018]. Yanyao Shen, Hyokun Yun, Zachary Lipton, Yakov Kronrod, and Animashree Anandkumar, "Deep active learning for named entity recognition," In ICLR, 2018.

[Strubell et al., 2017]. Emma Strubell, Patrick Verga, David Belanger, and Andrew McCallum, "Fast and accurate entity recognition with iterated dilated convolutions," In EMNLP, 2017.

[Li et al., 2017]. Peng-Hsuan Li, Ruo-Ping Dong, Yu-Siang Wang, Ju-Chieh Chou, and Wei-Yun Ma, "Leveraging linguistic structures for named entity recognition with bidirectional recursive neural networks," In EMNLP, pages 2664-2669, 2017.

[Ghaddar and Langlais, 2018]. Abbas Ghaddar and Philippe Langlais, "Robust lexical features for improved neural network named-entity recognition," In *COLING*, pages 1896-1907, 2018.

CVT+MultiTask [2018]. Kevin Clark, Minh-Thang Luong, Christopher Manning, and Quoc Le. Semi-supervised sequence modeling with cross-view training. In *EMNLP*, pages 1914-1925, 2018.

JointNERCoref [Luan et al., 2018]. Yi Luan, Luheng He, Mari Ostendorf, and Hannaneh Hajishirzi, "Multi-task identification of entities, relations, and coreference for scientific knowledge graph construction," In *EMNLP*, pages 3219-3232, 2018. Note that for the code was downloaded from bitbucket.org/luanyi/scierc/src/master/, and rel weight=0 was set to disable the relation inference task and other network architecture hyperparameters were carefully tuned over a wide range on the validation set.

Similar to the result on the Dataset 1, better NER performance is achieved by using embodiments with coreference layer or with coreference layer and coreference regularization. Therefore, a full NER model embodiment achieves the state-of-the-art F1-score of 89.83% on the dataset as well, which outperforms the previous best-published result (88.81%) of Clark et al. (2018) by a large margin. Again, it is demonstrated that the noisy coreference knowledge extracted from an external system is still usable in the framework embodiments disclosed in the current patent document for improving the NER performance.

It is worth mentioning that the latest multi-task joint NER and coreference resolution model [Luan et al., 2018] performs worse than our embodiments, even worse than those traditional sequence labeling approaches. One possible reason is that the implicit knowledge transfer by sharing intermediate layers for the NER and coreference resolution tasks is not as effective as explicitly imposing the coreference regularization. Besides, brute force enumeration of all possible span candidates ignores the inner dependency among sub-chunks of entities, which can be better captured by sequence labeling.

E. Some Analysis and Discussion

1. Ablation Study

To understand how much contribution each major component of a full model embodiment makes, an ablation study was performed as illustrated in TABLE 5.

TABLE 5

Ablation study on the Dataset 1. The NER performance is reported when each component was removed from the full model. If the coreference regularization was used, it was set as $\lambda = 1.0$.

| Model | F1 Score Mean (±std) | Max |
|---|---|---|
| Full Model | 93.19 (±0.13) | 93.35 |
| w/o coref regularization | 92.86 (±0.11) | 93.04 |
| w/o coref layer & regularization | 92.32 (±0.10) | 92.45 |
| w/o GloVe embedding | 93.03 (±0.11) | 93.14 |
| w/o Character-level CNN | 93.13 (±0.10) | 93.27 |
| w/o ELMo embedding | 91.62 (±0.21) | 91.96 |

Clearly, removing the coreference regularization and coreference layer significantly deteriorates the model performance by 0.3 and 0.9 points, respectively (statistical significant t-test with p<0.01). Among three parts of expanded word vector including GloVe, characters and ELMo, the ELMo embedding makes the most contribution and improves the NER result by 1.5 points on average, which is consistent with the observation of Peters et al. (2018).

2. Choice of Coreference Layer and Coreference Regularization

Similar vs. Same Coreferential Representations. Two variants of the coreference layer introduced in Section 3.2 were evaluated. The comparative study under the same settings (base model+coreference layer w/o coreference regularization and ELMo) showed that, as the input of the CRF layer, similar coreferential representations (91.53% F1-score) generated by Equation (1) are significantly better than the exact same coreferential representations (91.21% F1-score) as the output of Equation (2). One potential explanation is that the important context information of individual entity is missing if all entities are enforced within one coreference cluster to share the same representation in vector space.

Cosine vs. Euclidean Coreference Regularization. Two types of coreference regularization introduced in Section 3.3 were evaluated. The experiment result showed that the "Cosine Coreference Regularization" clearly outperformed the "Euclidean Coreference Regularization" with 91.65% vs. 91.23% F1-score (we set $\lambda=0.1$ for a fair comparison), which meets expectations that the cosine similarity can better parameterize the similarity between two vectors than the Euclidean distance in vector space.

Impact of Coreference Regularization $\lambda$. From TABLE 6, it can be seen that the coreference regularization parameter $\lambda$ has a nontrivial effect on the performance of model embodiments. It is recommended to choose $\lambda$ from the range [0.1, 1.0] and tune it based on the density of coreference relations in the data (e.g., smaller $\lambda$ for higher coreference relations density).

TABLE 6

Impact of the coreference regularization $\lambda$ on the Base Model + Coreference Layer + Coreference Regularization.

| Dataset | Dataset 1 | | Dataset 2 | |
|---|---|---|---|---|
| $\lambda$ | Mean (± std) | Max | Mean (± std) | Max |
| 0.01 | 91.48 (±0.19) | 91.83 | 89.03 (±0.08) | 89.18 |
| 0.1 | 91.65 (±0.15) | 91.89 | 89.07 (±0.17) | 89.32 |
| 0.5 | 91.60 (±0.11) | 91.74 | 89.08 (±0.12) | 89.22 |
| 1.0 | 91.62 (±0.21) | 91.96 | 88.89 (±0.10) | 89.09 |
| 1.5 | 91.53 (±0.11) | 91.71 | — | — |
| 2.0 | 91.46 (±0.12) | 91.66 | — | — |
| 5.0 | 91.44 (±0.11) | 91.65 | — | — |

3. Impact of Coreference Knowledge Quality

Figure 10:
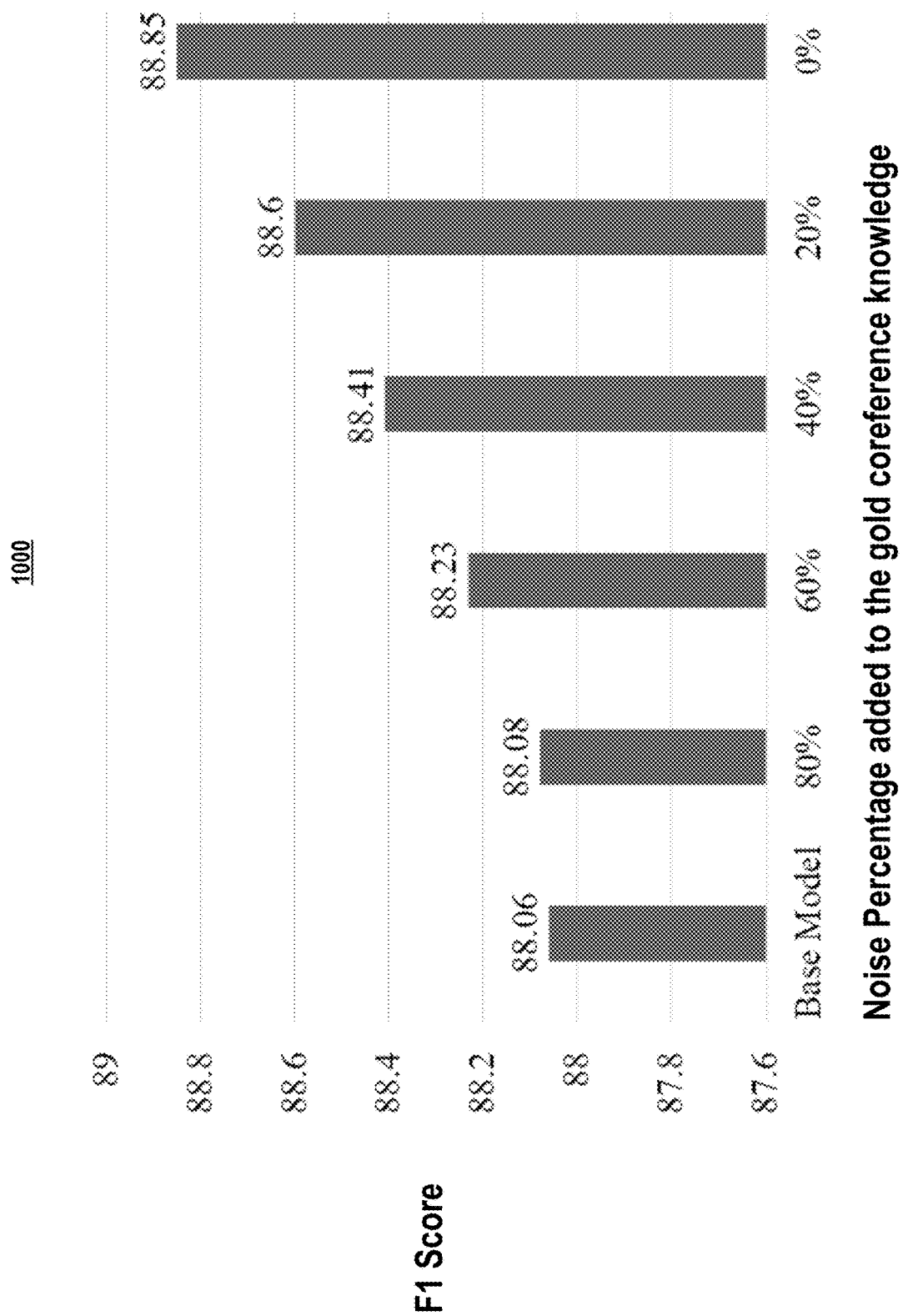
FIG. 10 depicts the impact of the coreference knowledge quality on a coreference-aware NER model, according to embodiments of the present disclosure.

Since gold coreference knowledge is rare and valuable, it is important for the framework embodiments disclosed herein to tolerate the noisy coreferential relations as prior knowledge. In order to study the influence of the coreference quality on model embodiments, noise was gradually added into Dataset 2's gold coreference clusters by randomly deleting or fluctuating (±5) the coreferential entities' indices with a certain probability (i.e., noise percentage). As shown in FIG. 10, the F1 score increases quickly with less noise and the coreference layer component embodiment can still improve the NER performance with 60% noise in the coreference knowledge, which demonstrates the robustness of model embodiments.

4. Case Study

To study the behavior of a model embodiment and better understand what types of errors made by Ma and Hovy (2016) were corrected by the coreference-aware approach of the current patent document, an error analysis was performed on a dataset. To make the contributions of the current embodiment clear, the ELMo embedding was not used for both models.

Some of the types of errors corrected by the tested embodiment relative to the prior model include the following (NOTE: Named entities in underline text are wrongly predicted with labels in parentheses in italics subscript. Named entities in bold text are correctly predicted by considering coreferential entities in italics text using an embodiment of the coreference-aware approach disclosed in the current patent document):

1) Boundary—incorrectly including one or more words in one instance of an entity relative to another instance of the same entity (e.g., "[Defender Mark Abba]$_{(PER)}$ . . . [Mark Abba]$_{(PER)}$" should be "Defender [Mark Abba]$_{(PLR)}$ . . . [Mark Abbas]$_{(PER)}$").

2) Mixed Entities—incorrectly grouping a set of words as a single entity when it is a mixture of two or more entities (e.g., "[Canada]$_{(LOC)}$ vs. [Saint John World Series]$_{(LOC)}$ . . . in the [World Series]$_{(MISC)}$ limited match between [Canada]$_{(LOC)}$ and [Saint John]$_{(LOC)}$ . . ." should be "Canada vs. [Saint John]$_{(LOC)}$ [World Series]$_{(MISC)}$ . . . in the [World Series]$_{(MISC)}$ limited match between [Canada]$_{(LOC)}$ and [Saint John]$_{(LOC)}$ . . .").

3) Inconsistent Type—incorrectly predicting different label types for the same entity (e.g., "[Bella Marin]$_{(PER)}$ of [National Canada]$_{(LOC)}$ . . . championship in which [National Canada]$_{(ORG)}$ . . ." should be "[Bella Marin]$_{(PER)}$ of [National Canada]$_{(ORG)}$ . . . championship in which [National Canada]$_{(ORG)}$ . . .").

4) Inconsistent Boundary—failing to properly group words together to correctly identify an entity (e.g., "Canadians win [Commonwealth Cup]$_{(MISC)}$ [Winners' Cup]$_{(MISC)}$ . . . the result of the [Commonwealth Cup Winners' Cup]$_{(MISC)}$ final . . ." should be "Canadians win [Commonwealth Cup Winners' Cup]$_{(MISC)}$ . . . the result of the [Commonwealth Cup Winners' Cup]$_{(MISC)}$ final . . ."

5) Similar Entities—failing to properly predict labels for similar entities (e.g., "[Melbourne Cricket Ground]$_{(ORG)}$ . . . [Sydney Cricket Ground]$_{(LOC)}$ . . . [Melbourne]$_{(LOC)}$ Cricket Ground" should be "[Melbourne Cricket Ground]$_{(LOC)}$ . . . [Sydney Cricket Ground]$_{(LOC)}$ . . . [Melbourne Cricket Ground]$_{(LOC)}$").

A result of the case study showed that the approach of the current patent document not only helps correctly predict the semantic type of coreferential entities within a coreference cluster (the second, third, and fifth examples), but also locates the accurate boundary of coreferential named entities (the first, fourth, and fifth examples).

F. Some Conclusions

Presented herein were embodiments of a novel neural network model for the NER task, which builds the coreference-aware word representations by explicitly utilizing the coreferential relations with a coreference layer component embodiment. Also, in one or more embodiments, a coreference regularization embodiment was introduced to ensure the coreferential entities to share similar representations and consistent predictions within the same coreference cluster. Experiments on two benchmarks demonstrate that a full model embodiment with a coreference layer and coreference regularization significantly outperforms all previous NER systems, even given the noisy coreference information as prior knowledge.

G. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 11:
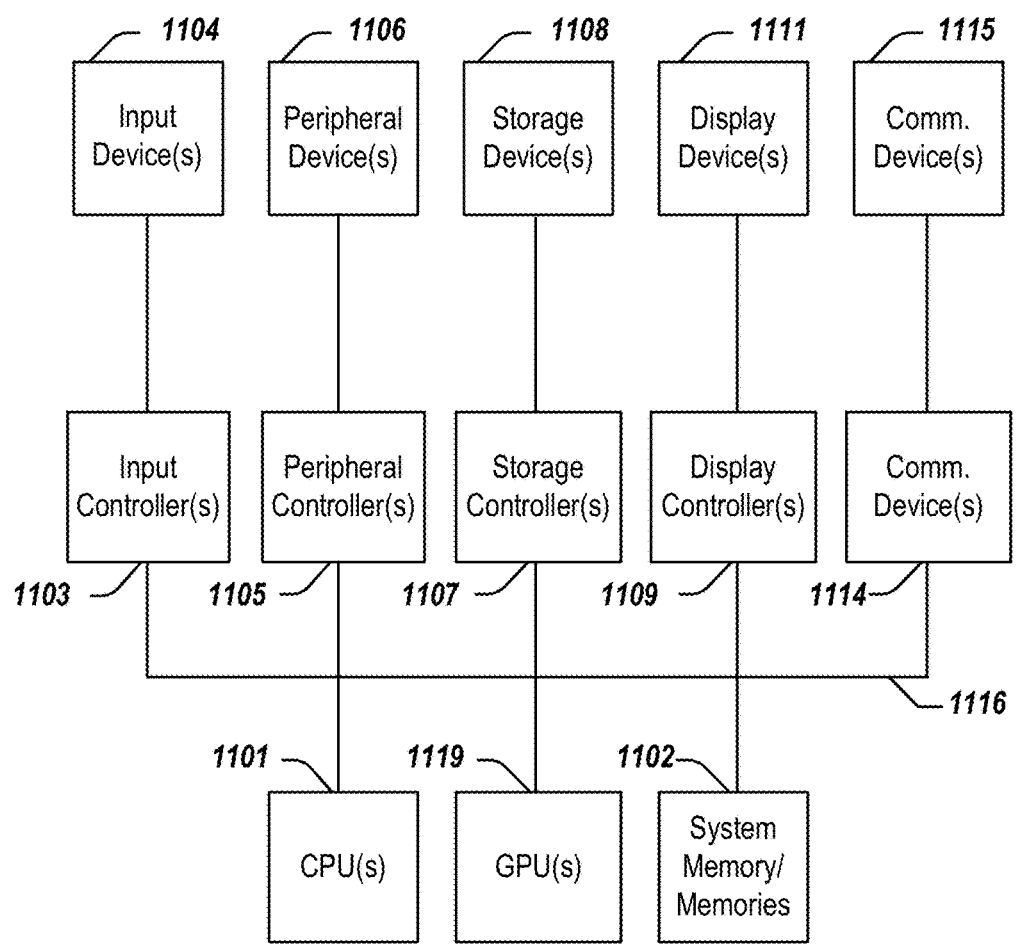
FIG. 11 depicts a simplified block diagram of a computing device/information handling system, in accordance with embodiments of the present disclosure.

FIG. 11 depicts a simplified block diagram of a computing device/information handling system (or computing system) according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more central processing units (CPU) 1101 that provides computing resources and controls the computer. CPU 1101 may be implemented with a microprocessor or the like, and may also include one or more graphics processing units (GPU) 1119 and/or a floating-point coprocessor for mathematical computations. System 1100 may also include a system memory 1102, which may be in the form of random-access memory (RAM), read-only memory (ROM), or both.

A number of controllers and peripheral devices may also be provided, as shown in FIG. 11. An input controller 1103 represents an interface to various input device(s) 1104, such as a keyboard, mouse, touchscreen, and/or stylus. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT), a thin film transistor (TFT) display, organic light-emitting diode, electroluminescent panel, plasma panel, or other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implement method comprising:
    inputting a document comprising words into a coreference-aware named entity recognition (NER) network comprising:
        a word embedding layer;
        an additional feature or features embedding layer;
        a character-level convolution neural network (CNN) with a character embedding layer as an input to the CNN;
        a word-level bi-direction long short-term memory (BLSTM) layer;
        a coreference layer; and
        a conditional random field (CRF) layer;
    for each word, combining outputs of the word embedding layer, the additional feature or features embedding layer, and the character-level CNN into a combined representation;
    obtaining a hidden representation for each word in the document using the combined representations and the word-level BLSTM layer; and
    using the hidden representations for the words in the document as an input to the coreference layer to obtain a coreference representation for each word in the document; and
    determining a label sequence for the document using the coreference representations as inputs into the CRF network that jointly determines the label sequence for the document.

2. The computer-implement method of claim 1 wherein the step of using the hidden representations for the words in the document as an input to the coreference layer to obtain a coreference representation for each word in the document comprises:
    using the hidden representations for the words in the document and a set of coreference clusters associated with the document in which each coreference cluster in the set of coreference clusters comprises one or more words, phrases, or both that represent a same entity as an input to the coreference layer to obtain a coreference representation for each word in the document, in which words that are members of the same coreference cluster are assigned a same or similar coreference representation.

3. The computer-implement method of claim 2 further comprising:
minimizing an objective function comprising:
a loss for the CRF layer given the label sequence for the document relative to a ground truth label sequence for the document; and
a parameterized coreference regularization to penalize difference between coreference representations for different words of the document that are members of the same coreference cluster; and
using the loss to update parameters of the coreference-aware NER network.

4. The computer-implement method of claim 3 wherein the parameterized coreference regularization uses Euclidean distance.

5. The computer-implement method of claim 3 wherein the parameterized coreference regularization uses cosine similarity.

6. The computer-implement method of claim 2 wherein, given the hidden representations for each word in the document and the set of coreference clusters associated with the document, the coreference layer determines the coreference representation for a word as:
an activation applied to a weighted combination of the hidden representation and a coreference representation obtain by applying max-pooling to hidden representations of words in a coreference cluster if the word is a member of the coreference cluster; and
the hidden representation of the word if the word is not a member of any coreference cluster.

7. The computer-implement method of claim 2 wherein, given the hidden representations for each word in the document and the set of coreference clusters associated with the document, the coreference layer determines the coreference representation for a word as:
the hidden representation obtained by applying max-pooling to hidden representations of words in a coreference cluster if the word is a member of the coreference cluster; and
the hidden representation of the word if the word is not a member of any coreference cluster.

8. A non-transitory computer-readable medium or media comprising one or more sequences of instructions which, when executed by one or more processors, causes steps to be performed comprising:
inputting a document comprising words into a coreference-aware named entity recognition (NER) network comprising:
a word embedding layer;
an additional feature or features embedding layer;
a character-level convolution neural network (CNN) with a character embedding layer as an input to the CNN;
a word-level bi-direction long short-term memory (BLSTM) layer;
a coreference layer; and
a conditional random field (CRF) layer;
for each word, combining outputs of the word embedding layer, the additional feature or features embedding layer, and the character-level CNN into a combined representation;
obtaining a hidden representation for each word in the document using the combined representations and the word-level BLSTM layer; and
using the hidden representations for the words in the document as an input to the coreference layer to obtain a coreference representation for each word in the document; and
determining a label sequence for the document using the coreference representations as inputs into the CRF network that jointly determines the label sequence for the document.

9. The non-transitory computer-readable medium or media of claim 8 wherein the step of using the hidden representations for the words in the document as an input to the coreference layer to obtain a coreference representation for each word in the document comprises:
using the hidden representations for the words in the document and a set of coreference clusters associated with the document in which each coreference cluster in the set of coreference clusters comprises one or more words, phrases, or both that represent a same entity as an input to the coreference layer to obtain a coreference representation for each word in the document, in which words that are members of the same coreference cluster are assigned a same or similar coreference representation.

10. The non-transitory computer-readable medium or media of claim 9 further comprising one or more sequences of instructions which, when executed by at least one of the one or more processors, causes steps to be performed comprising:
minimizing an objective function comprising:
a loss for the CRF layer given the label sequence for the document relative to a ground truth label sequence for the document; and
a parameterized coreference regularization to penalize difference between coreference representations for different words of the document that are members of the same coreference cluster; and
using the loss to update parameters of the coreference-aware NER network.

11. The non-transitory computer-readable medium or media of claim 10 wherein the parameterized coreference regularization uses Euclidean distance.

12. The non-transitory computer-readable medium or media of claim 10 wherein the parameterized coreference regularization uses cosine similarity.

13. The non-transitory computer-readable medium or media of claim 9 wherein, given the hidden representations for each word in the document and the set of coreference clusters associated with the document, the coreference layer determines the coreference representation for a word as:
an activation applied to a weighted combination of the hidden representation and a coreference representation obtain by applying max-pooling to all hidden representations of words in a coreference cluster if the word is a member of the coreference cluster; and
the hidden representation of the word if the word is not a member of any coreference cluster.

14. The non-transitory computer-readable medium or media of claim 9 wherein, given the hidden representations for each word in the document and the set of coreference clusters associated with the document, the coreference layer determines the coreference representation for a word as:
the hidden representation obtained by applying max-pooling to all hidden representations of words in a coreference cluster if the word is a member of the coreference cluster; and
the hidden representation of the word if the word is not a member of any coreference cluster.

15. A system comprising:
one or more processors; and
a non-transitory computer-readable medium or media comprising one or more sets of instructions which, when executed by at least one of the one or more processors, causes steps to be performed comprising:
inputting a document comprising words into a coreference-aware named entity recognition (NER) network comprising:
a word embedding layer;
an additional feature or features embedding layer;
a character-level convolution neural network (CNN) with a character embedding layer as an input to the CNN;
a word-level bi-direction long short-term memory (BLSTM) layer;
a coreference layer; and
a conditional random field (CRF) layer;
for each word, combining outputs of the word embedding layer, the additional feature or features embedding layer, and the character-level CNN into a combined representation;
obtaining a hidden representation for each word in the document using the combined representations and the word-level BLSTM layer; and
using the hidden representations for the words in the document as an input to the coreference layer to obtain a coreference representation for each word in the document; and
determining a label sequence for the document using the coreference representations as inputs into the CRF network that jointly determines the label sequence for the document.

16. The system of claim 15 wherein the step of using hidden representations for the words in the document as an input to the coreference layer to obtain a coreference representation for each word in the document comprises:
using the hidden representations for the words in the document and a set of coreference clusters associated with the document in which each coreference cluster in the set of coreference clusters comprises one or more words, phrases, or both that represent a same entity as an input to the coreference layer to obtain a coreference representation for each word in the document, in which words that are members of the same coreference cluster are assigned a same or similar coreference representation.

17. The system of claim 16 further comprising one or more sequences of instructions which, when executed by at least one of the one or more processors, causes steps to be performed comprising:
minimizing an objective function comprising:
a loss for the CRF layer given the label sequence for the document relative to a ground truth label sequence for the document; and
a parameterized coreference regularization to penalize difference between coreference representations for different words of the document that are members of the same coreference cluster; and
using the loss to update parameters of the coreference-aware NER network.

18. The system of claim 17 wherein the parameterized coreference regularization uses cosine similarity.

19. The system of claim 16 wherein, given the hidden representations for each word in the document and the set of coreference clusters associated with the document, the coreference layer determines the coreference representation for a word as:
an activation applied to a weighted combination of the hidden representation and a coreference representation obtain by applying max-pooling to all hidden representations of words in a coreference cluster if the word is a member of the coreference cluster; and
the hidden representation of the word if the word is not a member of any coreference cluster.

20. The system of claim 16 wherein, given the hidden representations for each word in the document and the set of coreference clusters associated with the document, the coreference layer determines the coreference representation for a word as:
the hidden representation obtained by applying max-pooling to hidden representations of words in a coreference cluster if the word is a member of the coreference cluster; and
the hidden representation of the word if the word is not a member of any coreference cluster.

* * * * *